(12) United States Patent
Fuchs et al.

(10) Patent No.: US 10,570,874 B2
(45) Date of Patent: Feb. 25, 2020

(54) METHOD FOR OPERATING AN INTERNAL COMBUSTION ENGINE

(71) Applicant: INNIO Jenbacher GmbH & Co OG, Jenbach, Tiro, I (AT)

(72) Inventors: Jochen Fuchs, Wattens (AT); Christoph Weigl, Tirol (AT); Michael Roll, Wauwatosa, WI (US)

(73) Assignee: INNIO JENBACHER GMBH & CO OG, Jenbach (AT)

( * ) Notice: Subject to any disclaimer, the term of this patent is extended or adjusted under 35 U.S.C. 154(b) by 101 days.

(21) Appl. No.: 15/578,384

(22) PCT Filed: Apr. 20, 2016

(86) PCT No.: PCT/AT2016/050102
§ 371 (c)(1),
(2) Date: Nov. 30, 2017

(87) PCT Pub. No.: WO2016/191773
PCT Pub. Date: Dec. 8, 2016

(65) Prior Publication Data
US 2018/0209394 A1    Jul. 26, 2018

(30) Foreign Application Priority Data
Jun. 3, 2015  (AT) ........................... 349/2015

(51) Int. Cl.
*F02P 5/152* (2006.01)
*F02D 41/14* (2006.01)
(Continued)

(52) U.S. Cl.
CPC .......... *F02P 5/1522* (2013.01); *F02D 35/027* (2013.01); *F02D 41/1461* (2013.01);
(Continued)

(58) Field of Classification Search
CPC .................................................. F02P 5/1522
See application file for complete search history.

(56) References Cited

U.S. PATENT DOCUMENTS 5,035,219 A * 7/1991 Ohkumo ............... F02P 5/1506
                                                  123/406.33
6,247,448 B1 * 6/2001 Scholl .................. F02P 5/1522
                                                  123/406.21
(Continued)

FOREIGN PATENT DOCUMENTS

DE        35 778 A     1/1965
DE        1192 113 B   4/1965
(Continued)

OTHER PUBLICATIONS

Office Action and search report issued in connection with corresponding AT Application No. A349/2015 dated Dec. 14, 2015.
(Continued)

*Primary Examiner* — Hung Q Nguyen
*Assistant Examiner* — Mark L. Greene
(74) *Attorney, Agent, or Firm* — Fletcher Yoder, P.C.

(57) ABSTRACT

A method of operating an internal combustion engine with at least one piston-cylinder unit, and preferably a plurality of the piston-cylinder units, whereby, in a detection mode of the internal combustion engine one or more knock-promoting measures are taken until knocking has occurred in at least one piston-cylinder unit, and the measure(s) is/are intensified until a termination criterion is reached, whereby it is detected in which of the piston-cylinder units knocking has occurred, and whereby, in piston-cylinder units detected as knocking, the ignition time for a normal operating mode of the internal combustion engine is retarded.

20 Claims, 3 Drawing Sheets

(51) Int. Cl.
*F02D 41/24* (2006.01)
*F02D 35/02* (2006.01)
(52) U.S. Cl.
CPC ...... *F02D 41/2451* (2013.01); *F02D 2250/36* (2013.01); *Y02T 10/46* (2013.01)

(56) References Cited

U.S. PATENT DOCUMENTS

| | | |
|---|---|---|
| 7,383,816 B2 | 6/2008 | Zurlo |
| 2004/0088102 A1 | 5/2004 | Daniels et al. |
| 2009/0078027 A1 | 3/2009 | Morris et al. |

FOREIGN PATENT DOCUMENTS

| | | |
|---|---|---|
| DE | 33 43 542 A1 | 6/1985 |
| DE | 40 16 128 A1 | 11/1990 |
| DE | 195 47 167 A1 | 6/1997 |
| DE | 196 05 803 A1 | 8/1997 |
| DE | 10 2004 041 230 A1 | 3/2006 |
| DE | 10 2006 018 665 A1 | 11/2007 |
| DE | 10 2008 003 581 A1 | 8/2009 |
| EP | 0 288 056 A2 | 10/1988 |
| EP | 0 648 930 A2 | 4/1995 |
| FR | 1 048 354 A | 12/1953 |

OTHER PUBLICATIONS

International Search Report and Written Opinion issued in connection with corresponding PCT Application No. PCT/AT2016/050102 dated Jul. 13, 2016.

Office Action issued in connection with corresponding DE Application No. 102016005706.8 dated Dec. 30, 2016.

* cited by examiner

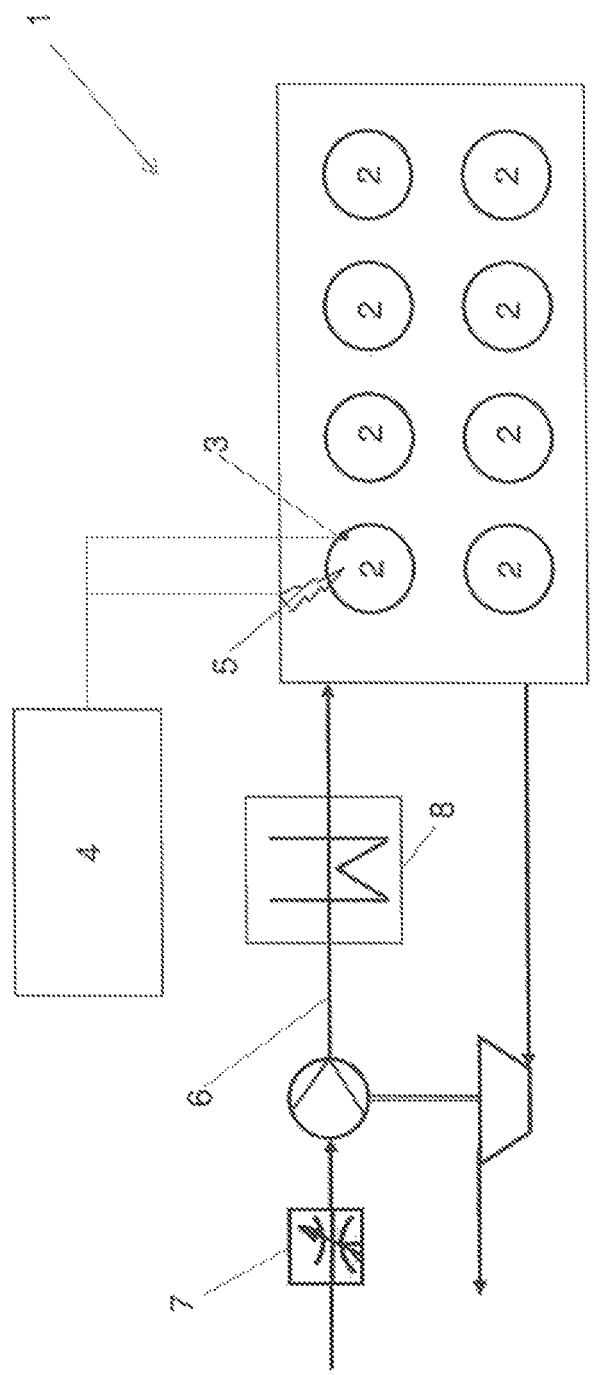

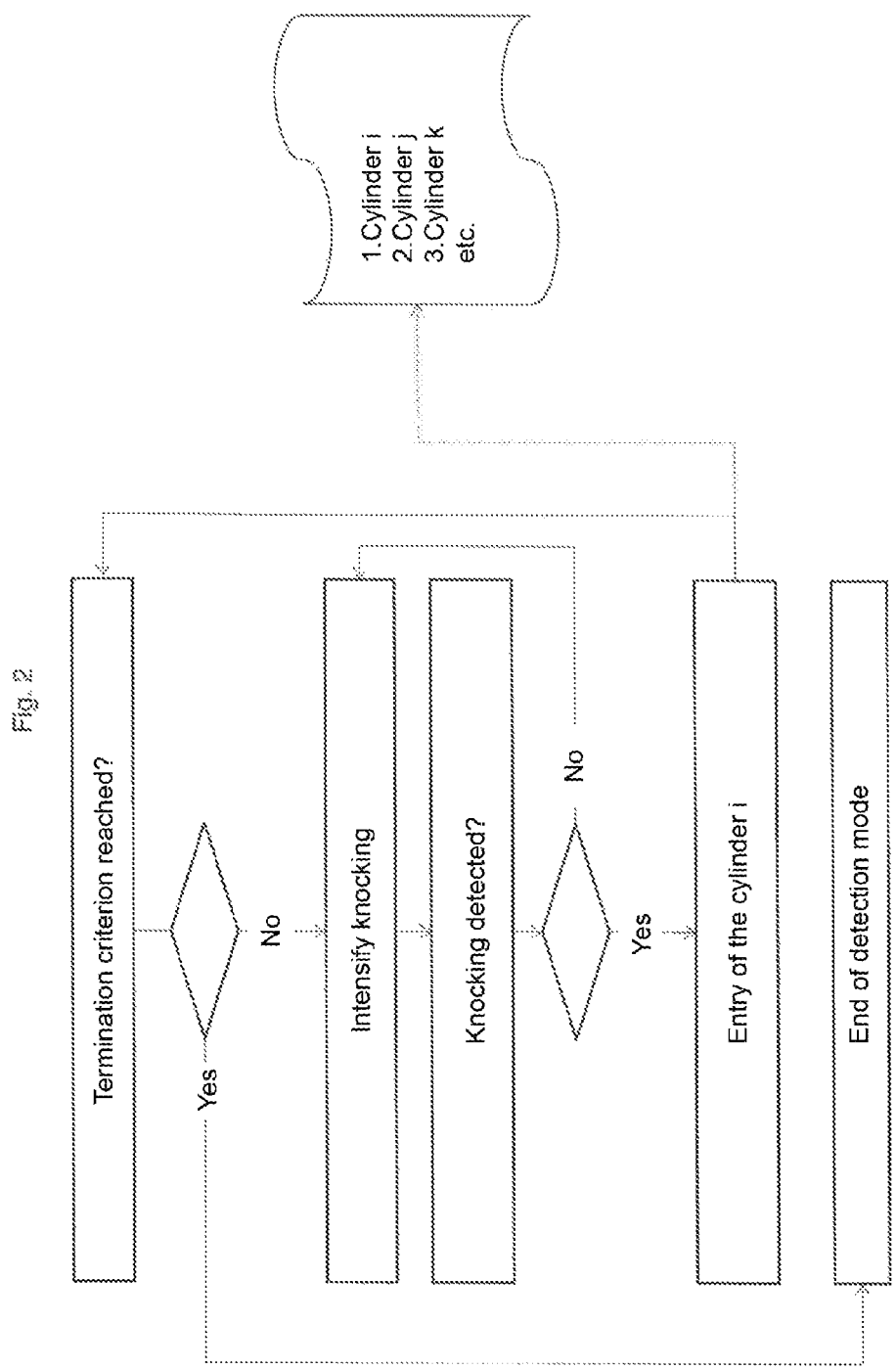

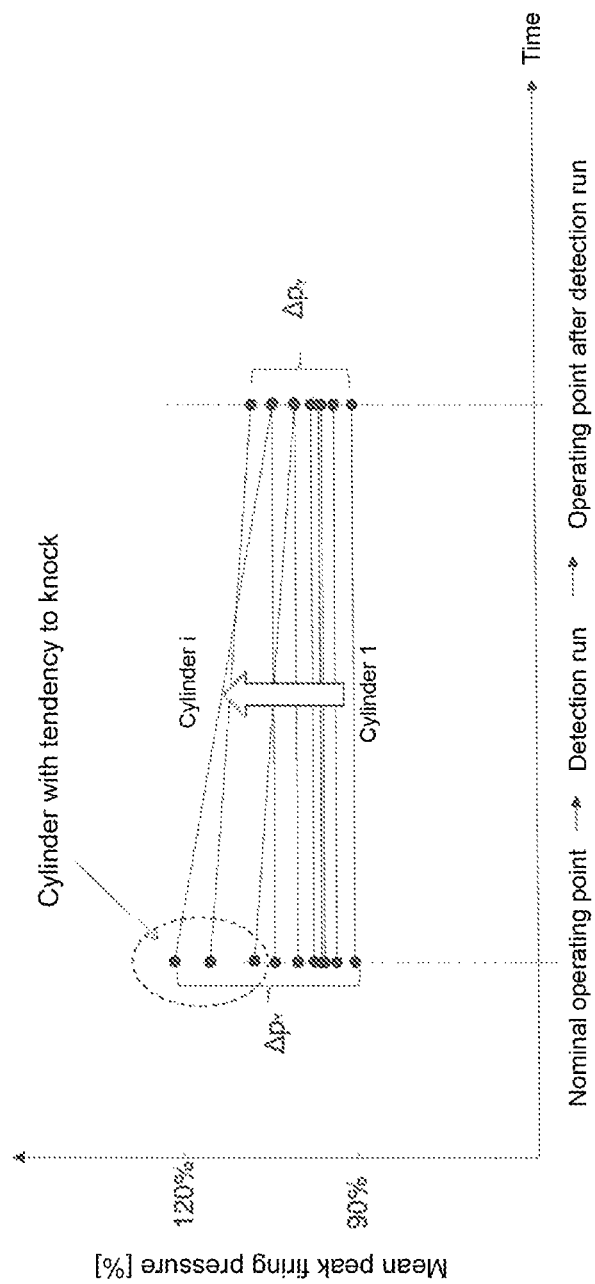

METHOD FOR OPERATING AN INTERNAL COMBUSTION ENGINE

FIELD OF INVENTION

The invention relates to a method for operating an internal combustion engine and an internal combustion engine.

BACKGROUND OF THE INVENTION

From the operation of internal combustion engines with a plurality of piston-cylinder units (in short: cylinders), it is known that the ignition pressures or the mean values of the ignition pressures of the individual piston-cylinder units differ from one another by different influencing factors. Influencing factors which lead to such a variation of the ignition pressures are e.g. oil and propellant gas deposits in the combustion chamber, different flow conditions of the cylinder head spin, spark plug contamination, different intake temperatures in individual cylinders, manufacturing tolerances which influence the compression ratio, valve clearance and valve clearance changes, differences in the air ratio in individual cylinders, pressure oscillations in the intake system, crankshaft vibrations, camshaft vibrations, etc.

This spreading of the ignition pressures (expressed as peak firing pressure, PFP) is undesirable, since the mobile operating point of the engine shifts strongly in the engine characteristic map (e.g. misfire limit, knock limit, limit due to the limited maximum exhaust gas turbocharger speed and maximum turbine intake temperature). At the same time, it is desirable to operate the internal combustion engine as close as possible to the knocking limit of the piston-cylinder units, since this is the operating point with the highest efficiency or the operating point is very close to the misfire limit to reduce nitrogen oxide emissions. Cylinders with a high peak firing pressure already run closer to the knocking limit than cylinders with lower peak firing pressure, meaning that spreading of the ignition pressures is also undesirable with regard to the achievable efficiency.

Equalization of the piston-cylinder units with regard to their peak firing pressure is usually performed in the prior art via cylinder pressure sensors or alternative sensors, which can supply a signal which is characteristic of the peak firing pressure. Examples are sensors for measuring the combustion chamber temperature or ion current sensors.

DE 10 2004 041230 A1, for example, discloses a method for cylinder equalization in which maximum cylinder pressures are determined in an individual cylinder by means of an ion current measurement and mean values of the maximum pressures are formed, whereby at least one cylinder is identified, as a function of a comparison between cylinder groups, whose operating behavior is to be influenced.

It is known from DE 19605803 A1 that an ion current signal can be used to detect the knocking of the internal combustion engine and to display a corresponding knock control by means of control of the ignition time.

U.S. Pat. No. 7,383,816 B2 discloses a method for operating an internal combustion engine in which an advance of an ignition time of a first subset of piston-cylinder units is performed from an operating ignition time until a knocking event is detected, while simultaneously operating the remaining piston-cylinder units at the operating ignition time. A first knock limit of the first subset of piston-cylinder units is thus determined with respect to a difference between the operating ignition time and the ignition time at the time of the knock event. By advancing the ignition sequence in a second subset of piston-cylinder units from an operating ignition time while simultaneously operating the remaining piston-cylinder units at the operating ignition time, a second knock limit of the second subset of piston-cylinder units is determined in relation to a difference between the operating ignition time and the ignition time at the moment of the knock event. This serves the purpose of determining a characteristic of a propellant which is supplied to the piston-cylinder units with respect to the first and second knock limits. By means of this method, the knock resistance of a fuel supplied to the internal combustion engine can be determined. The ignition time of the internal combustion engine can then be adapted to the knock resistance of the fuel.

BRIEF DESCRIPTION

An object of an embodiment of this invention is to provide an improved method for cylinder equalization in comparison with the prior art or an improved internal combustion engine.

This object is achieved by a method with the features of claim 1 and an internal combustion engine with the features of claim 8. Embodiments of the invention are defined in the dependent claims.

Thus, in one detection mode—in an embodiment starting from a knock-free operating state—of the internal combustion engine, e.g. one or more of the following measures are set until the presence of at least one termination criterion, i.e. in practice only for a short time: Increasing the power of the internal combustion engine; Advancing the ignition times of the piston-cylinder units; Increasing the temperature of a gas-air mixture fed to the piston-cylinder units; Increasing the gas fraction of a gas-air mixture fed to the piston-cylinder units until knocking has been reached in at least one piston-cylinder unit, and the measure(s) is/are further intensified until a termination criterion is reached, whereby it is detected, in which piston-cylinder unit the knocking has been reached, and whereby, in those piston-cylinder units in which knocking is detected, the ignition time is retarded in a normal operating mode of the internal combustion engine, the mechanical stress on the internal combustion engine and the associated risk of damage and a shutdown are reduced.

A further advantage is the extended maintenance intervals due to reduced wear on the piston-cylinder units.

"Further intensified measures" means that the respective measure is further strengthened in a direction that encourages knocking. An example of this is an adjustment of an ignition time to still earlier times.

In other words, the internal combustion engine is purposefully guided into knocking. Since, as described above, the individual piston-cylinder units are operated at different distances from their individual knock limits, the measure(s) do(es) not lead to a sudden onset of knocking in all of the piston-cylinder units; rather, by continuing or further intensification of the measure(s), ever more piston-cylinder units begin to knock. Knocking occurs first with those piston-cylinder units which were already closer to the knock limit in the settings before taking the measure.

In other words, in an embodiment based on the fact that there is a clear dependence between knocking and peak firing pressure. I.e.: Cylinders that tend to knock have a higher ignition pressure (peak firing pressure) than cylinders that do not tend to knock.

If an advance of ignition times of the piston-cylinder units is selected as a measure of the detection mode, this can be performed e.g. in 4° CA (crank angle) steps. The ignition time (IT) indicates the crankshaft position of an internal combustion engine with spark ignition in which the ignition spark is triggered at the spark plug. The ignition time is indicated in degrees crank angle before TDC (top dead center=the highest position of the piston in the cylinder). It is known that advancing the IT (i.e. to an earlier time, expressed as a larger crank angle before TDC) leads to an increased knocking tendency.

To give a numerical example, the global ignition time of IT can be set from 20° CA (crank angle) to earlier, e.g. 24° CA and further to 28° CA. An internal combustion engine usually has an earliest IT before which the IT may not be shifted.

After each change of the global IT, a certain time is waited and run with the newly set IT until a stable operation of the internal combustion engine has been reached. This interval duration can be e.g. 3 minutes.

It is in an embodiment provided that the termination criterion is used for taking the measures, reaching or exceeding a predetermined pollutant emission limit. This can be e.g. the NOx concentration emitted by the internal combustion engine.

In the case of those piston-cylinder units which have knocking on the occurrence of the termination criterion, the ignition time is retarded in a normal operating mode of the internal combustion engine, i.e. shifted to later times. By shifting the ignition time to later times, the ignition pressure is known to be reduced compared to an earlier ignition time. Those piston-cylinder units which have already shown a high ignition pressure before running the detection mode start to knock earlier than piston-cylinder units with a lower ignition pressure when taking the measures of the detection mode. The detection mode thus detects those piston-cylinder units which have a high ignition pressure.

It can in an embodiment be provided that the detection of knocking in more than 50% of the piston-cylinder units is used as the termination criterion.

A termination criterion of detecting knocking in more than 50% of the piston-cylinder units does not mean that actually more than 50% of the piston-cylinder units are operated with knocking. On the contrary, the knocking control implemented in the case of detecting knocking of a piston-cylinder unit directly counteracts the knocking by delaying the IT of the respective piston-cylinder unit.

The termination criterion is thus understood as meaning that knocking is detected in more than 50% of the piston-cylinder units when detection mode is running. It is therefore the cumulative number of piston-cylinder units of the internal combustion engine in % in which knocking is detected when detection mode is running. For a 24-cylinder engine, this would be more than 12 cylinders in which knocking is detected when detection mode is running.

In an embodiment, the detection mode is repeated either manually or automatically after a predetermined number of operating hours of the internal combustion engine. The running of the detection mode generates an ignition time profile for each individual piston-cylinder unit. The ignition time profile means that the individual piston-cylinder units are assigned new ignition times.

A retardation of the ignition times for those piston-cylinder units in which knocking is detected in detection mode can have a fixed amount, e.g. −3° CA, or an individual value resulting from the knock control, i.e. from the just described ignition time profile.

By means of the method, piston-cylinder units with a high ignition pressure can be effectively identified and the ignition pressure for normal operating mode can be effectively reduced by retarding the ignition time of those piston-cylinder units in which knocking is detected in detection mode. The particular advantage of the method according to in an embodiment, inter alia, the elimination of costly sensor systems, e.g. cylinder pressure sensors. A closed-loop control based on the output signals of such a sensor system is not required.

Protection is also desired for an internal combustion engine with a plurality of piston-cylinder units, a sensor device for the cylinder-specific detection of knocking, and a control/regulating device designed to perform a method as described above.

Example

The routine starts with the nominal settings of a normal operating mode of the internal combustion engine, in an embodiment at full engine load, since the ignition pressure is at its highest there and the internal combustion engine is running close to the knock limit. In the case of the engine model selected as an example, these are:

$P_{me,Startroutine}$=20 bar with $P_{me}$ as brake mean effective pressure (BMEP)

NOx≤500 mg/Nm$^3$ @ 5% O2 dry as NOx emission in mg/Nm$^3$, (NOx short for nitrogen oxide emissions)

$IT_{nom}$=20° CA, global nominal IT for all cylinders in normal operating mode before detection mode $T2'_{nom}$=50° C., mixture intake temperature or charge-air temperature in ° Celsius Adjustment of the global ignition time in 4° CA steps to earlier ignition times, 20° CA→24° CA→28° CA until the earliest possible ignition time has been reached. In this engine model, this is 27° CA.

Wait for three minutes with changed parameters until a stationary operating state has been set.

If the advance of the ignition time in the context of the permissible ignition time limit for the selected internal combustion engine does not lead to the knocking of so many piston-cylinder units, so that the termination criterion of more than 50% knocking piston-cylinder units is achieved, then the combustion air ratio lambda is set in 0.01 steps. Reducing the combustion air ratio lambda leads to an enrichment of the mixture.

Here we start with lean gas engines that operate at full engine load in a lambda range (fuel-air ratio) of 1.6-2.2; in lambda-one engines (stoichiometric), an enrichment (lambda<1.0) would lead to misfires.

Even after a change of lambda, a certain period time, e.g. three minutes, must be waited until a stable operating state has been set. The enrichment of the mixture, like an adjustment of the ignition time to earlier, causes an approach of the internal combustion engine or the piston-cylinder units to the knock limit.

As the termination criteria for the routine, it is set e.g. that the detection mode is terminated when knocking is detected in 50% of the piston-cylinder units. As soon as the knock control detects knocking in a piston-cylinder unit, the ignition time of the respective piston-cylinder unit is adjusted by a certain value, e.g. minus 3° CA—therefore set to later—whereby the respective piston-cylinder unit is no longer knocking. In a 24-cylinder engine, this means that 12 cylinders have received a later ignition time (which can, however, be different for each of them).

An alternative or additional termination criterion may consist of the ignition time of a piston-cylinder unit deviating by more than 4° CA from the currently provided nominal ignition time (global ignition time of the internal combustion engine) before knocking is reached. In other words, one cylinder knocks very strongly compared to the other cylinders and the ignition time would have to be made much later for this cylinder. This termination criterion provides for the termination of the routine by a single piston-cylinder unit that knocks so massively that it interferes with the operation of the entire internal combustion engine.

As a further alternative or additional termination criterion, it can be provided that a certain cumulative ignition time adjustment is reached. If, for example, with three piston-cylinder units, the ignition times are moved by 4° CA, this gives a cumulative ignition time adjustment of 12° CA. This termination criterion may be combined, e.g. in combination with a decrease of the lambda value by a certain amount, e.g. 0.05.

Alternatively, the routine can be run so that the global ignition time at the start of detection mode is an adjusted ignition time minus 0.2° CA with respect to the global ignition time in normal operation mode. If the internal combustion engine at the nominal operating point already reduces the ignition time (IT), then this is an indication that the engine has aged. The more the mean IT deviates from the nominal IT, the stronger the engine knocks at the nominal operating point and detection mode may no longer need to be executed.

Again, as the termination criterion of the routine, it can be selected that detection mode is terminated when 50% of the piston-cylinder units have received a retarded ignition time due to detection of knocking. An alternative termination criterion may consist of a cylinder deviating by more than e.g. 5° CA (i.e. by a relatively large value) from the currently set global ignition time of the detection mode. A numerical example would be reaching 27° CA as a global ignition time, whereby a piston-cylinder unit reaches 21° CA.

As stated above, a cumulative ignition time adjustment can also be selected as a further termination criterion. Thus, a cumulative adjustment of three piston-cylinder units by 4° CA corresponding to a cumulative ignition time adjustment by 12° CA may be defined as the termination criterion. The termination criterion of the cumulative ignition time adjustment can be combined in particular in combination with an increase in the lambda value, e.g. to 0.02, during the detection mode.

In general, an ignition time deviation of individual piston-cylinder units should be limited in the routine by the global ignition time presetting. The ignition time profile (presetting of the ignition time based on the ignition time adjustments of the knocking piston-cylinder units made in detection mode) may differ from the nominal ignition time after the routine by a maximum of minus 3° CA. During the routine itself, this limitation may indeed be lifted.

An adaptation of a possibly provided emission controller to the changed ignition times can remain switched on during the routine—i.e. active.

Upon completion of the routine, the controller ends the detection mode and returns to normal operating mode with a new ignition time profile, with the ignition times resulting from the detection mode.

It is also conceivable to apply the method only to a selection, i.e. a subset of the piston-cylinder units: the detection mode could e.g. initially be run only for a part of the piston-cylinder units, or even only for one piston-cylinder unit and, after completion of the routine, another detection mode or further detection modes can be started for the remaining piston-cylinder units.

It is in an embodiment provided that the internal combustion engine is a lean operation Otto gas engine, in particular, an internal combustion engine with a generator coupled to a genset.

BRIEF DESCRIPTION OF THE DRAWINGS

The invention is explained in more detail with reference to the figures. They are as follows:

FIG. 1 a schematic representation of an internal combustion engine,

FIG. 2 a flow diagram of a method and

FIG. 3 diagram of peak cylinder pressures of an internal combustion engine.

DETAILED DESCRIPTION

FIG. 1 shows a schematic representation of an internal combustion engine 1 with a plurality of the piston-cylinder units 2. The piston-cylinder units 2 (only one of which is shown for reasons of clarity) are in each case equipped with an ignition device 5, which is connected to a control/regulating unit 4 in a signal connection.

The ignition time of a piston-cylinder unit 2 can be determined by a corresponding control of the ignition device 5 by the control/regulating device 4.

The piston-cylinder units 2 also have a sensor device 3, by means of which knocking of the respective piston-cylinder unit 2 can be detected. The sensor device 3 may be designed e.g. as a structure-borne sound sensor. The signals detected by the sensor device 3 can be sent to the control/regulating device 4.

Also shown is an intake line 6, via which a fuel or fuel-air mixture can be supplied to the internal combustion engine 1.

In the intake line 6, a charge-air cooler 8 can be arranged. Upstream of a compressor, a gas mixer 7 can be provided, through which a fuel-air ratio can be adjusted.

FIG. 2 shows a flow diagram of the detection mode in the method.

At the start of the routine, it is queried whether the termination criterion has already been reached. The termination criterion can be e.g. whether a certain number of the piston-cylinder units 2 are already knocking.

If this is not the case, i.e. "No", the knock-intensifying measure(s) are taken in the internal combustion engine 1 until knocking has been reached in at least one piston-cylinder unit 2. However, it must not be ruled out that one or more piston-cylinder units 2 are already knocking. If knocking is detected in a further piston-cylinder unit 2, this is recorded and stored e.g. in a list (indicated at the right in the figure). A list can be used to note e.g. which piston-cylinder units 2 have started knocking and in what sequence.

If no knocking is detected, the knock-intensifying measure(s) are continued or intensified until the termination criterion has been reached.

If the termination criterion is reached, the ignition time for a normal operating mode of the internal combustion engine 1 is retarded for the piston-cylinder units 2 detected as knocking. By retarding (setting to later) the ignition time of a piston-cylinder unit 2, it is moved away from the knock limit.

The flow diagram shown illustrates an embodiment of the method.

In one variant, it is not permitted that a plurality of the piston-cylinder units 2 knock simultaneously, but the ignition time of the respective piston-cylinder unit 2 is retarded immediately after the detection of knocking. In the routine, it can be provided, however, that it is noted which piston-cylinder unit 2 has started knocking and for which the ignition time was already adjusted.

The ignition time (IT) can therefore be adjusted according to the following options: running of the routine until a plurality of knocking piston-cylinder units 2 is obtained collective retardation of the IT by different amounts or collective retardation of the IT by the same amount and repetition of the routine or in an embodiment: immediately after detecting knocking on a piston-cylinder unit 2, adjustment of the IT of the affected piston-cylinder unit 2 and continuation of the routine.

In the variants under point I, knocking is therefore awaited for a plurality of piston-cylinder units before responding, while in variant II the response is immediate. Of course, a mixed form of variants I and II is also conceivable, according to which we wait for the knocking of a subset of the piston-cylinder units 2 and the IT is then adjusted for this subgroup.

FIG. 3 shows a diagram of the peak cylinder pressures of individual piston-cylinder units 2 of an internal combustion engine 1 plotted as a percentage over time. This representation shows the mean values over a number of combustion cycles.

On the left side of the diagram (indicated as "nominal operating point") are the typical values of the peak cylinder pressure, as they occur in the operation of an internal combustion engine in the prior art.

A mean effective pressure $P_{me}$ amounts to e.g. 20 bar; the global ignition time is at 20° CA.

In this example, therefore, the piston-cylinder unit with the counter 1 ("Cylinder 1") has a mean peak firing pressure of 90%. The percentage value can refer e.g. to a mechanical design of the piston-cylinder units. The piston-cylinder unit with the counter i ("Cylinder" i), on the other hand, has a mean peak firing pressure of 120%.

The spread of the peak cylinder pressure, i.e. the difference between the peak firing pressure of the most heavily charged piston-cylinder unit and the peak firing pressure of the least charged piston-cylinder unit is indicated by $\Delta p_x$. At the nominal operating point, the spread $\Delta p_x$ is approx. 120–90=30%.

The piston-cylinder units with high mean peak firing pressures are also highlighted. These have a tendency to knock.

The right side of the diagram shows the situation after implementation of the method in the internal combustion engine. The mean effective pressure $P_{me}$ in this example is unchanged at 20 bar, even after going through the knock reduction method.

The mean value of the ignition times is now 19.7° CA before top dead center, i.e. a little later than before going through the method.

It can clearly be seen that the spread $\Delta p_y$, i.e. the difference between the highest mean peak firing pressure and the lowest mean peak firing pressure, is significantly reduced compared with the spread $\Delta p_x$ before going through the method.

The absolute values of the peak firing pressure of those cylinders which previously had an excessively high mean peak firing pressure are also significantly reduced.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A method of operating an internal combustion engine, comprising:
   in a detection mode of the internal combustion engine, performing one or more knock-promoting measures until knocking occurs in at least one piston-cylinder unit of a plurality of piston-cylinder units;
   intensifying the one or more knock-promoting measures until reaching a termination criterion;
   detecting the at least one piston cylinder unit of the plurality of piston-cylinder units having the knocking; and
   retarding an ignition time for the at least one piston-cylinder unit detected as having the knocking for a normal operating mode of the internal combustion engine.

2. The method according to claim 1, wherein the detection mode starts from a knock-free operating state of the internal combustion engine.

3. The method according to claim 1, wherein the knock-promoting measures include one or more of:
   (1) increasing a power of the internal combustion engine;
   (2) advancing ignition times of the plurality of piston-cylinder units;
   (3) increasing a temperature of a gas-air mixture fed to the plurality of piston-cylinder units; or
   (4) increasing a gas fraction of the gas-air mixture fed to the plurality of piston-cylinder units.

4. The method according to claim 1, wherein the termination criterion comprises reaching or exceeding a predetermined pollutant emission limit.

5. The method according to claim 4, wherein the predetermined pollutant emission limit comprises a predetermined NOx emission limit.

6. The method according to claim 1, the termination criterion comprises a detection of the knocking in more than 50% of the plurality of piston-cylinder units during the detection mode as a result of the one or more knock-promoting measures.

7. The method according to claim 1, comprising repeating the detection mode after a predetermined number of operating hours of the internal combustion engine.

8. An internal combustion engine, comprising:
   a plurality of piston-cylinder units;
   at least one sensor configured to sense knocking in each of the plurality of piston-cylinder units; and
   a controller configured to execute a routine to perform one or more knock-promoting measures until knocking occurs in at least one piston-cylinder unit of the plurality of piston-cylinder units, intensify the one or more knock-promoting measures until reaching a termination criterion, detect the at least one piston-cylinder unit of the plurality of the piston-cylinder units having knocking, and retard an ignition time for the at least one piston-cylinder unit detected as having the knocking for a normal operating mode of the internal combustion engine.

9. The system according to claim 8, wherein the knock-promoting measures include one or more of:
   (1) increasing a power of the internal combustion engine;
   (2) advancing ignition times of the plurality of piston-cylinder units;
   (3) increasing a temperature of a fuel-air mixture fed to the plurality of piston-cylinder units; or (4) increasing a fuel fraction of the fuel-air mixture fed to the plurality of piston-cylinder units.

10. The system according to claim 8, wherein the termination criterion comprises reaching or exceeding a predetermined pollutant emission limit.

11. The system according to claim 10, wherein the predetermined pollutant emission limit comprises a predetermined NOx emission limit.

12. The system according to claim 8, wherein the termination criterion comprises a detection of the knocking in more than 50% of the plurality of piston-cylinder units during a detection mode of the controller as a result of the one or more knock-promoting measures.

13. A system, comprising:
   a controller configured to: execute a routine to perform one or more knock-promoting measures until knocking occurs in at least one piston-cylinder unit of a plurality of piston-cylinder units, intensify the one or more knock-promoting measures until reaching a termination criterion, detect the at least one piston-cylinder unit of the plurality of the piston-cylinder units having knocking, and retard an ignition time for the at least one piston-cylinder unit detected as having the knocking for a normal operating mode of an internal combustion engine.

14. The system according to claim 13, comprising at least one sensor configured to sense knocking in each of the plurality of piston-cylinder units.

15. The system according to claim 14, the system further comprising one or more of the plurality of piston-cylinder units.

16. The system according to claim 13, comprising a machine having the plurality of piston-cylinder units and the controller.

17. The system according to claim 13, wherein the knock-promoting measures include one or more of:
   (1) increasing a power of the internal combustion engine;
   (2) advancing ignition times of the plurality of piston-cylinder units;
   (3) increasing a temperature of a fuel-air mixture fed to the plurality of piston-cylinder units; or
   (4) increasing a fuel fraction of the fuel-air mixture fed to the plurality of piston-cylinder units.

18. The system according to claim 13, wherein the termination criterion comprises reaching or exceeding a predetermined pollutant emission limit.

19. The system according to claim 18, wherein the predetermined pollutant emission limit comprises a predetermined NOx emission limit.

20. The system according to claim 13, wherein the termination criterion comprises a detection of the knocking in more than 50% of the plurality of piston-cylinder units during a detection mode of the controller as a result of the one or more knock-promoting measures.

* * * * *